United States Patent [19]

Kirigaya

[11] Patent Number: 4,903,062
[45] Date of Patent: Feb. 20, 1990

[54] PROTECTIVE APPARATUS FOR DISPLAYING PORTION OF PHOTOGRAPHING DATA IN A CAMERA

[75] Inventor: Tadayuki Kirigaya, Tokyo, Japan

[73] Assignee: Asahi Kogaku Kogyo K.K., Tokyo, Japan

[21] Appl. No.: 172,212

[22] Filed: Mar. 23, 1988

[30] Foreign Application Priority Data

Mar. 26, 1987 [JP] Japan .............................. 62-44832[U]

[51] Int. Cl.⁴ ...................... G03B 17/02; G03B 17/18; G03B 17/56
[52] U.S. Cl. .................................... 354/225; 354/288; 354/289.1
[58] Field of Search ........................ 354/465, 471–475, 354/219, 225, 288 R, 288 A, 288 P, 288 U, 202, 289.1, 289.12, 484

[56] References Cited

U.S. PATENT DOCUMENTS

| 4,005,460 | 1/1977 | Mizukawa | 354/202 |
| 4,483,601 | 11/1984 | Sekida et al. | 354/288 |
| 4,522,478 | 6/1985 | Kando et al. | 354/288 |
| 4,560,261 | 12/1985 | Ueda et al. | 354/471 |
| 4,560,264 | 12/1985 | Kitazawa et al. | 354/289.1 X |

Primary Examiner—W. B. Perkey
Attorney, Agent, or Firm—Sandler & Greenblum

[57] ABSTRACT

An apparatus for protecting the photographing data display portion of in a camera having a protecting cover which covers the photographing display portion. The protective cover can close and open the photographing data displaying portion.

16 Claims, 14 Drawing Sheets

PRIOR ART 4,903,062

PROTECTIVE APPARATUS FOR DISPLAYING PORTION OF PHOTOGRAPHING DATA IN A CAMERA

BACKGROUND OF THE INVENTION

1. Field of the Invention

The present invention relates to an apparatus for protecting a display for photographing data in a camera, and more precisely it relates to a protecting apparatus for a large liquid crystal, EL or LED panel in a single lens reflex camera.

2. Description of Related Art

In recent automatic and electronic cameras, the exposure control, the focus adjustment, film winding and rewinding, setting of film sensitivity, and control of strobe illumination can be automatically affected, and operational modes, such as shutter priority, diaphragm priority, and program automation, and shutter modes, such as single photography, continuous photography, and timer photography can be selected.

To give the necessary photographing data to an operator, especially in a single lens reflex camera, a large displaying portion is provided, as disclosed, for example, in USP 4,483,601 or USSN 934,055, which will be assigned to the assignee of the present application.

FIG. 15 shows a known large display portion disclosed in the above-mentioned prior art, in which a liquid crystal panel 84 which forms a displaying portion is provided on a pentagonal prism housing 82 of a camera body 80.

However, foreign matter or the like tends to collide with the liquid crystal panel 84, resulting in damage to, or breakage of, the panel. The tendency increases as the panel becomes larger.

SUMMARY OF THE INVENTION

The primary object of the present invention is to eliminate the aforementioned drawback by providing a simple apparatus for protecting the photographing data display portion of a camera.

To achieve the object mentioned above, the protecting apparatus according to the present invention has a protecting cover which is preferably capable of opening and closing on the photographing data display portion provided on a camera body. The protecting cover may be immovable if it is at least partially transparent, and if not, it is, for example, of a slidable or rotatable type.

With the arrangement mentioned above, the photographing data display portion can be protected by the protecting cover, so that no foreign matter can come into collision therewith.

BRIEF DESCRIPTION OF THE ACCOMPANYING DRAWINGS

The invention will be described below in detail with reference to the accompanying drawings, in which.

DETAILED DESCRIPTION OF EMBODIMENTS

Figure 1:
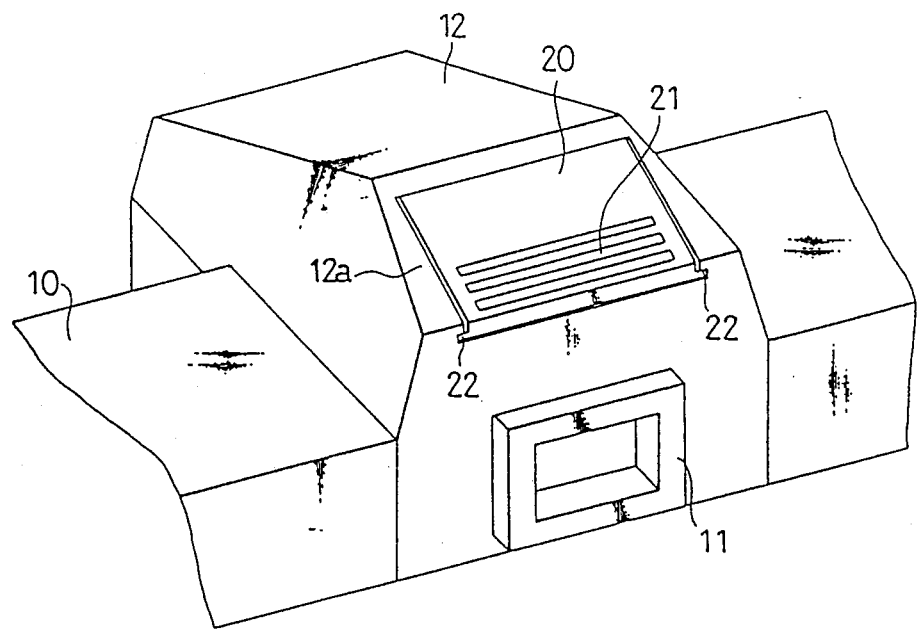
FIG. 1 is a perspective view of a protecting cover which is provided on an upper portion of a single lens reflex camera, according to a first embodiment of the present invention.
Figure 2:
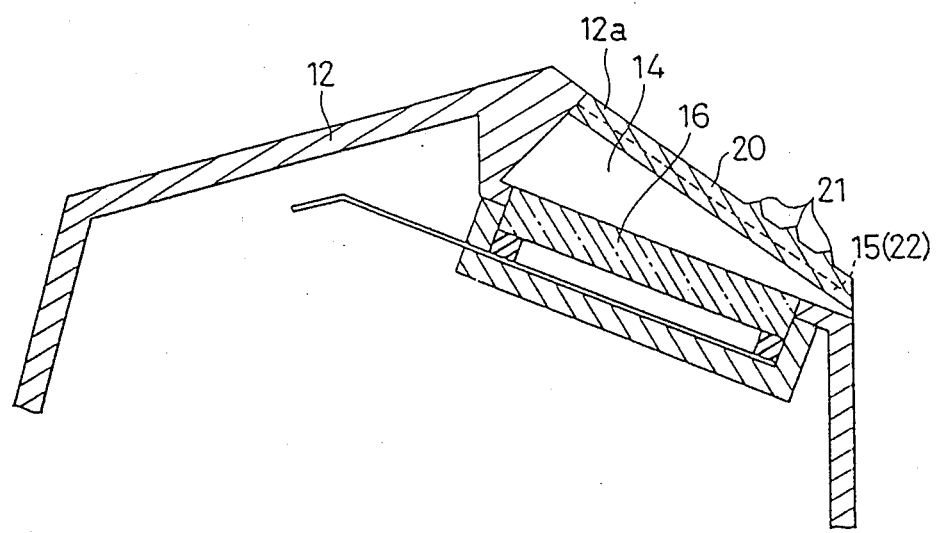
FIG. 2 is a longitudinal sectional view of the single lens reflex camera shown in FIG. 1, taken along a plane including the optical axis thereof.
Figure 3:
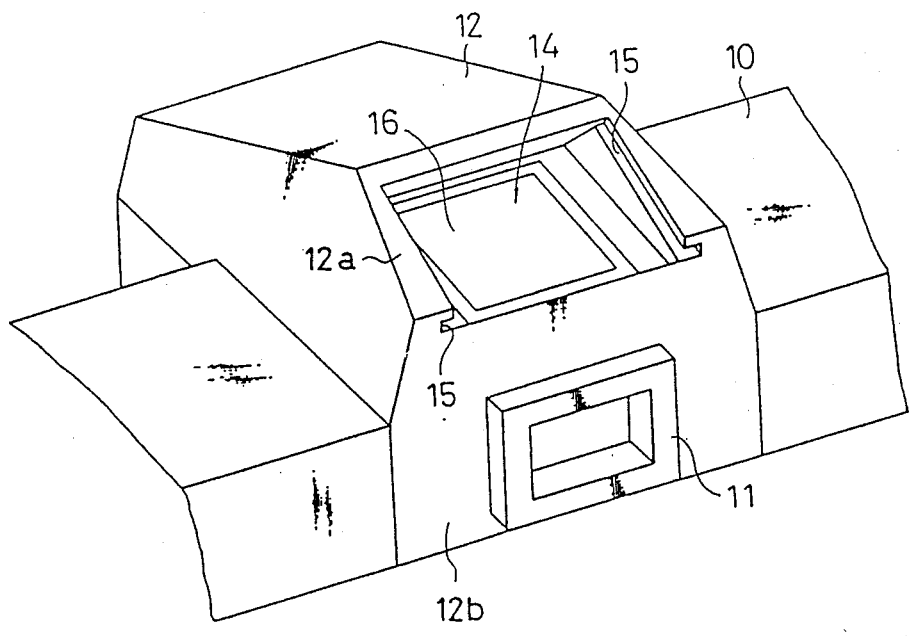
FIG. 3 is a perspective view of the single lens reflex camera shown in FIG. 1, with a removed slidable protecting cover.

With reference to FIGS. 1, 2, 3, 4A and 4B, which show the first embodiment of the present invention, a camera body 10 has a pentagonal prism housing 12 which is provided, on its rear upper portion, with a recess 14 in which a liquid crystal panel 16 is provided along the bottom of the recess 14 (FIGS. 2 and 3). The upper side wall portions of the recess 14 that are located on the opposite sides of the liquid crystal panel 16 are provided with parallel guide grooves 15, 15 which extend in parallel with an inclined rear upper surface 12a of the pentagonal prism housing 12, as can be seen in FIG. 3. The rear end portions (lower ends) of the guide grooves 15 open into a rear surface 12b of the pentagonal prism housing 12 above a finder eyepiece frame 11 (FIG. 3).

A slidable protecting cover 20 is inserted in the guide grooves 15 from the open ends (lower ends) of the grooves so that the recess 14 can be closed by the slidable protecting cover 20 (see FIG. 1). Namely, the liquid crystal panel 16 is covered and protected by the slidable protecting cover 20.

Figure 4A:
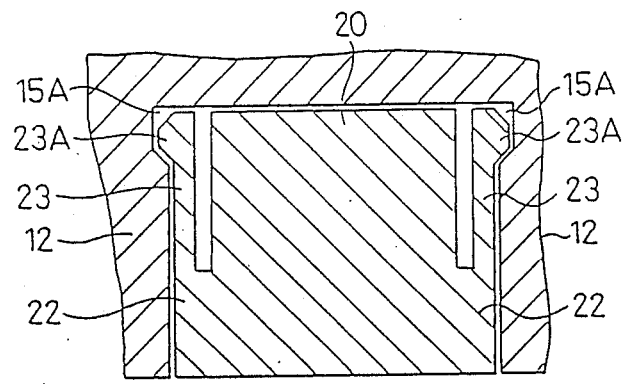
FIGS. 4A and 4B are partial cross sectional and longitudinal sectional views of a slidable protecting cover, respectively.
Figure 4B:
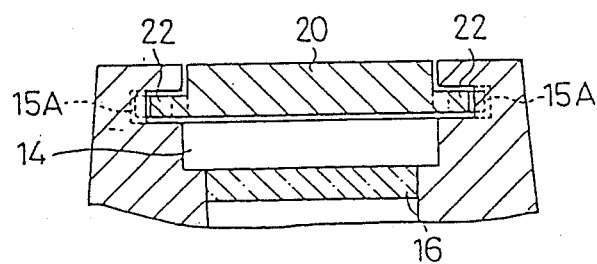

The slidable protecting cover 20 has projections 22 on the opposite side lower ends and arms 23 connected to the associated projections in the longitudinal direction of the projections, as shown in FIG. 4A. The projections 22 project outward, so that they can be fitted into the guide groove 15. The arms 23 are elastically deformable inward. The arms 23 have at the front free ends thereof projecting abutments 23A which project outward. The projecting abutments 23A are brought into slide contact with the bottoms of the guide grooves 15 when inserted in the guide grooves 15, so that when the slidable projecting cover 20 completely closes the recess 14, the projecting abutments 23A are fitted in corresponding recesses 15A formed in the bottom portions of the guide grooves 15 to hold the projecting cover 20 in a closed position in which the recess 14 is closed by the slidable protecting cover 20.

When the slidable projecting cover 20 is removed from the recess 14 to see the displayed information of the liquid crystal panel 16, an operator puts his or her finger on frictional ridges 21 which are provided on the upper surface of the slidable protecting cover 20 to slide the cover 20 down. Until the projecting abutments 23A are disengaged from the corresponding recesses 15A as a result of a flexible deformation of the arms 23, it is necessary to slide the cover 20 with a relatively large force. However, once the projecting abutments 23A are disengaged from the corresponding recesses 15A, the slidable protecting cover 20 can be easily pulled out from grooves 15 with a smaller force.

Figure 5:
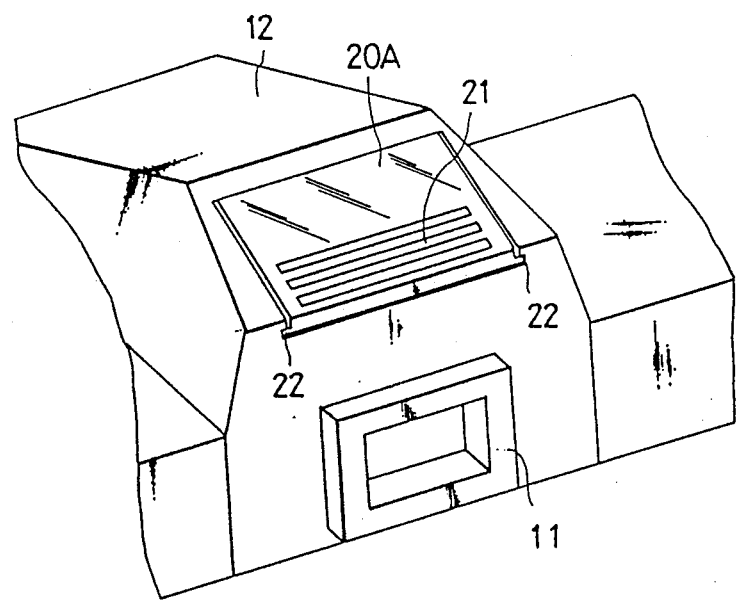
FIG. 5 is a perspective view of a variant of FIG. 1.

FIG. 5 shows a transparent slidable protecting cover 20A. In this variant, it is possible to see the photographing data through the transparent protecting cover 20 without sliding the latter.

Figure 6:
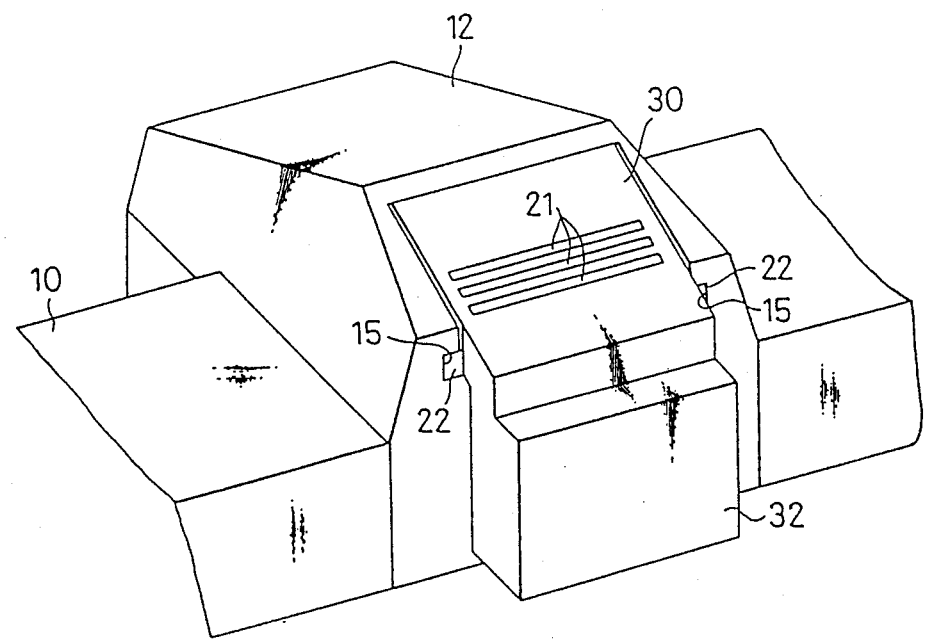
FIGS. 6 and 7 are views similar to FIGS. 1 and 2, according to a second embodiment of the present invention, respectively.
Figure 7:
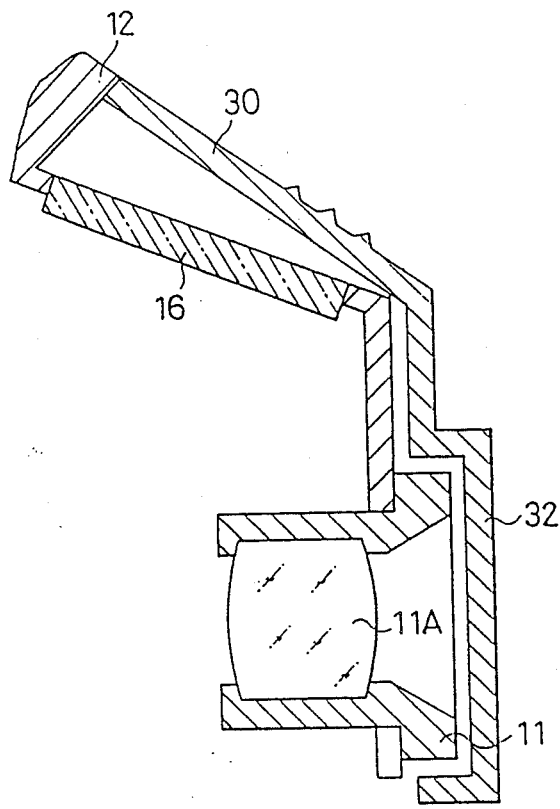

FIGS. 6 and 7 show a second embodiment of the present invention, in which a slidable protecting over 30 is integral with a cap 32 for preventing the light from being incident in the camera body from the finder. The construction of the slidable protecting cover 30 is substantially the same as that of the slidable protecting cover 20 in the aforementioned first embodiment, except for the integrated cap 32. The cap 32 covers the rear portion of the finder eyepiece frame 11 to prevent the incident light from the finder from entering when the slidable protecting cover 30 completely closes the recess 14.

Figure 8:
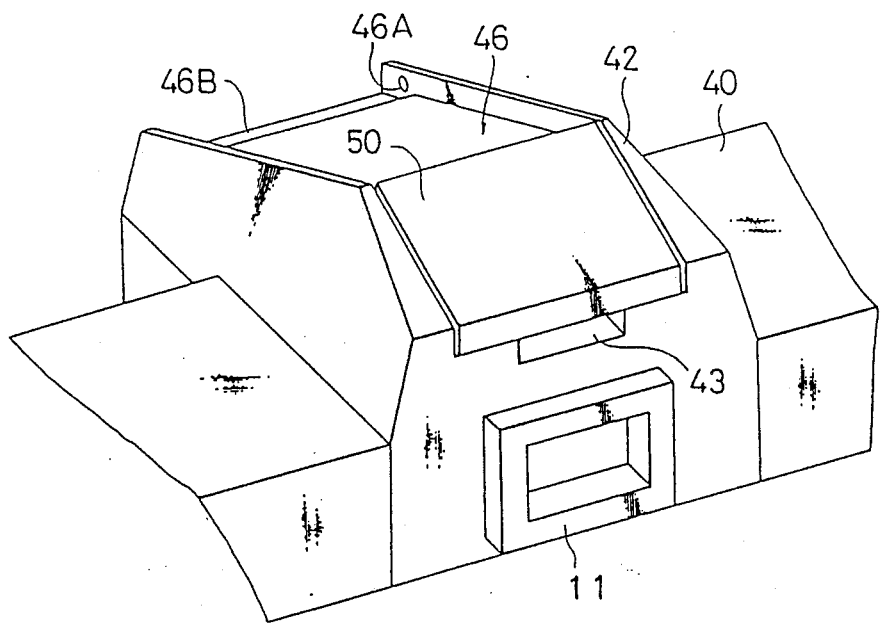
FIGS. 8 and 9 are views similar to FIGS. 1 and 2, according to a third embodiment of the present invention, respectively.
Figure 10:
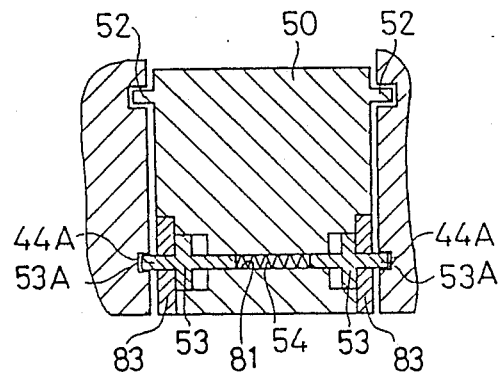
FIG. 10 is a sectional view of the rotatable protecting cover of the third embodiemnt illustrated in FIGS. 8 and 9.
Figure 9:
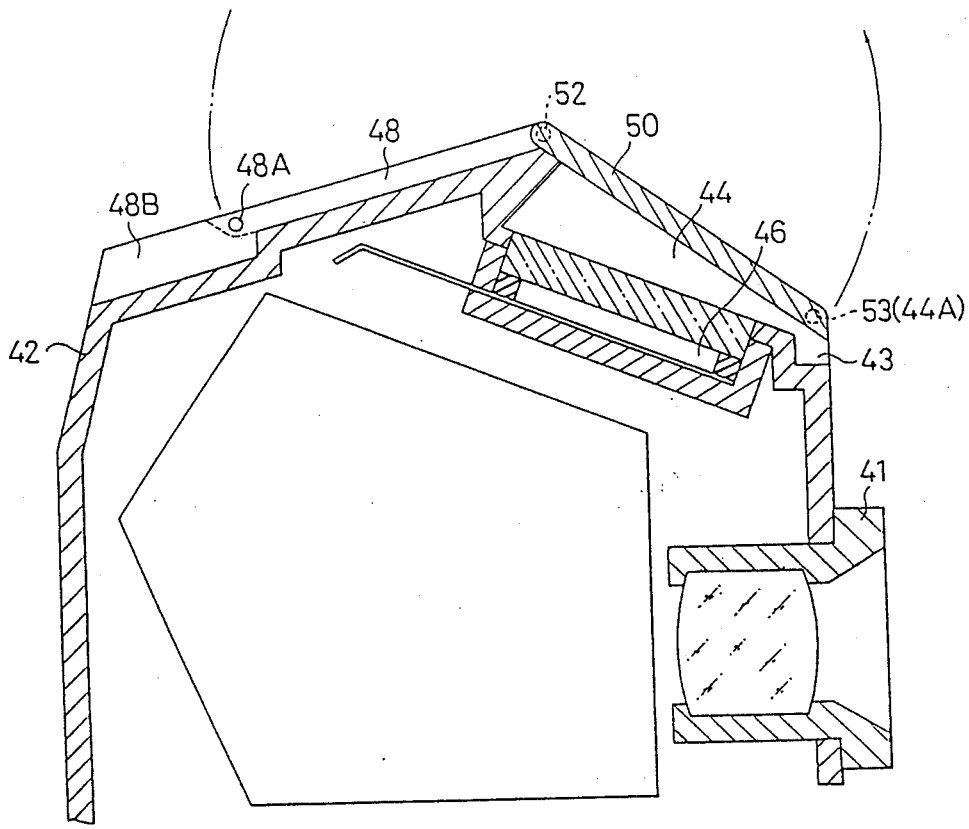

In FIGS. 8 to 10, which show a third embodiment of the present invention, the slidable protecting cover 20 or 30 in the above-mentioned embodiments is replaced with a rotatable protecting cover 50. On the upper surface of the pentagonal prism housing 42 of the camera body 40 are formed continuous recesses 44 and 48 which are interconnected by a bordering ridge. The liquid crystal 46 is embedded in the bottom of the rear recess 44. The rotatable protecting cover 50 is rotatably attached to the pentagonal prism housing 42 by means of a shaft 52 which extends substantially along with the bordering ridge of the recesses 44 and 48. so that the rotatable protecting cover 50 can be rotated between a first rotational position in which the cover 50 is located in the rear recess 44 and a second rotational position in which the cover 50 is located in the front recess 48.

The rotatable protecting cover 50 is provided, on its free end (lower end in FIGS. 8-10), which stop pins 53 which are axially biased by a compression spring 54 provided in a stepped hole 81 and which extends parallel to the shaft 52 of the rotatable protecting cover 50. Namely, the stop pins 53 are located in the stepped hole portions with a larger diameter, so that the stop pins are continuously biased outwardly in opposite directions, by spring 54. The pins 53 are prevented from coming out from the stepped hole 81 by keeper plates 83, which are secured to the rotatable projecting cover 50. Semisphereical front ends 53 of pins 53 project outwardly from stepped hole 81, so that the front ends 53A can be disengageably engaged in corresponding holes 44A which are formed in the side walls of recess 44. Pins 53 form, together with the corresponding holes 44A, a so-called click stop. When the pins 53 are engaged in the corresponding holes 44A by the spring force of the compression spring 54, the rotatable protecting cover 50 which covers the liquid crystal panel 46 is firmly held in the closed position. Namely, the rotatable protecting cover 50 is prevented from accidentally opening by the above-mentioned click stop mechanism.

Holes 48A, similar to the holes 44A, are provided in the side walls of the front recess 48, so as to form a similar click tsop mechanism. Namely, when the rotatable protecting cover 50 is rotated about the shaft 52 to come to the second rotational position in which the cover 50 covers the front recess 48, the stop pins 53 are engaged in the corresponding holes 48A to hold the rotatable protecting cover 50 in an open position.

When a user sees the necessary information in the liquid crystal panel 46, the user puts his or her finger in an insertion opening 43 (FIGS. 8 and 9) which is formed in the pentagonal prism housing 42 as part of the rear recess 44 to which is located below the rotatable protecting cover 50 which is in the closed position (first rotational position) so as to rotate the rotatable protecting cover 50 about the shaft 52 to open the cover 50. A relatively strong rotational force is needed to rotate and open the rotatable protecting cover 50 from the closed position so as to disengage the stop pins 53 from the corresponding holes 44A against the spring force of the compression spring 54. The disengagement of the stop pins 53 from the corresponding holes 44A is made possible by the semispherical front ends 53A of the stop pins 53.

Once the stop pins 53 are disengaged from the corresponding holes 44A, the rotatable protecting cover 50 can be easily rotated to the second rotational position (open position) in which the cover 50 is positioned in the front recess 48 with a smaller rotational force.

When the rotatable protecting cover 50 approaches the extremity of the second rotational position (i.e., the open position), namely when the rotatable protecting cover 50 comes between the opposite wide walls of the front recess 48, it is necessary to force the rotatable protecting cover 50 down with a relatively large force until the stop pins 53 are engaged in the corresponding holes 48A. When the engagement of the stop pins 53 in the corresponding holes 48A is established, the rotatable protecting cover 50 is firmly held in the open position (second rotational position) by the click stop mechanism. It should be appreciated that the front recess 48 is provided, on its front end, with a stepped opening portion 48B (FIG. 9) in which a user's finger is inserted when the rotatable protecting cover 50 is rotated from the open position (second rotational position) toward the closed position (first rotational position).

Figure 11:
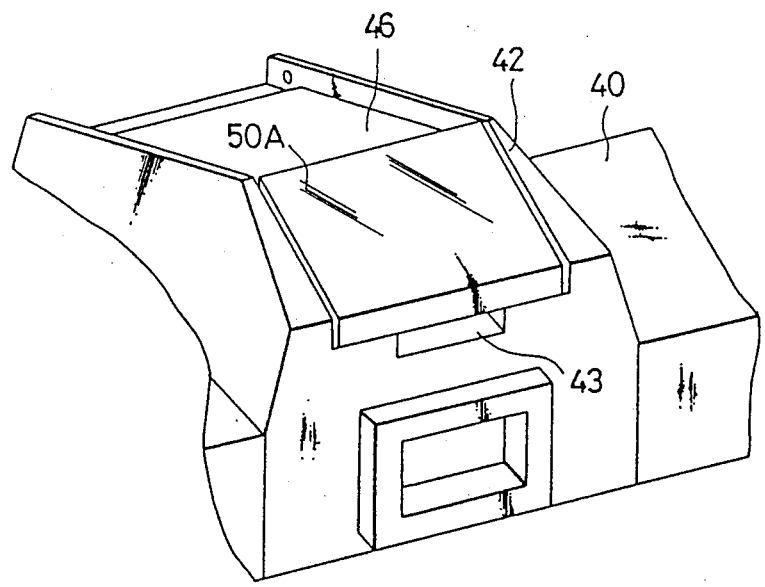
FIG. 11 is a perspective view of a variant of FIG. 8.

FIG. 11 shows a transparent rotatable protecting cover 50A. In this variant, it is possible to see the photographing data on the liquid crystal through the transparent protecting cover 50A without rotating the cover.

Figure 12:
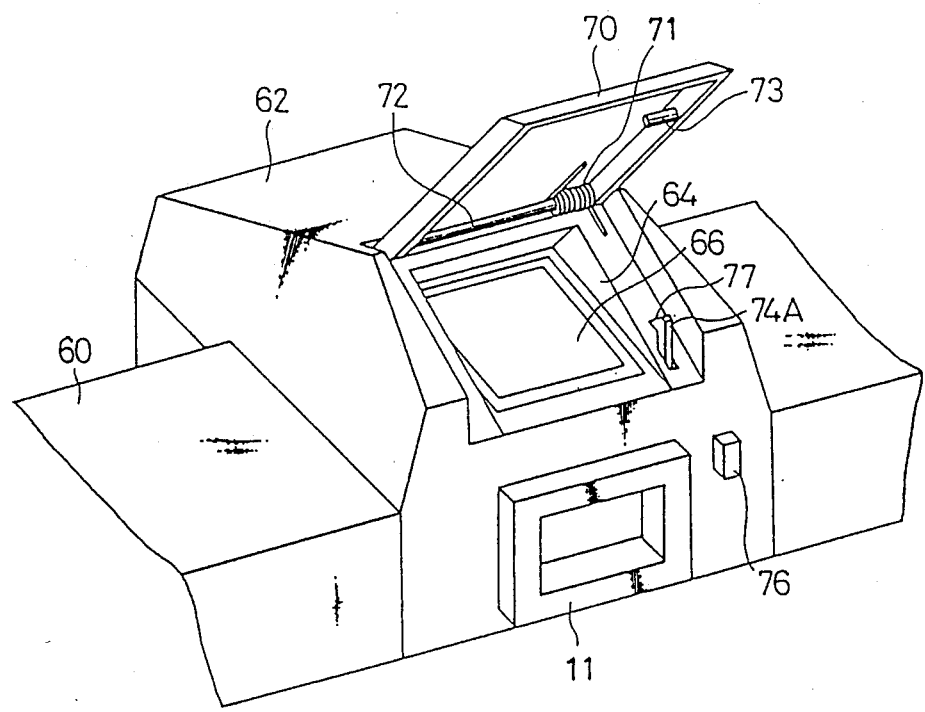
FIG. 12 is a view similar to FIG. 1, according to a fourth embodiment of the present invention.
Figure 13:
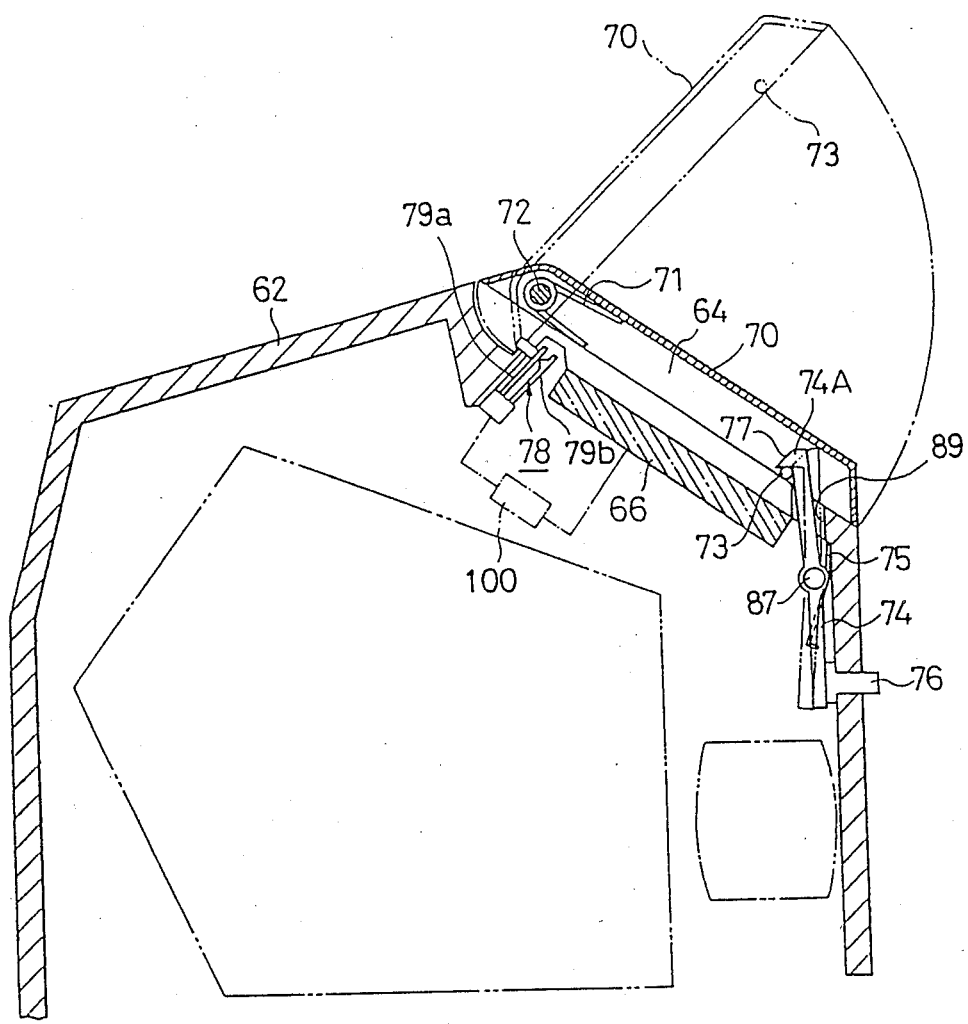
FIG. 13 is a partial longitudinal sectional view of a single lens reflex camera shown in FIG. 12, taken along a plane passing through a lock pin of a rotatable protecting cover.

FIGS. 12 and 13 show a fourth embodiment of the protecting cover according to the present invention.

In FIGS. 12 and 13, the pentagonal prism housing 62 of the camera body 60 is provided, on its rear upper surface, with a recess 64 which has the liquid crystal panel 66 embedded in the bottom thereof. The recess 66 can be closed by a rotatable protecting cover 70 which is rotatable about a shaft 72 between a closed position (first rotational position) and an open position (second rotational position). The rotatable protecting cover 70 is continuously biased toward the open position by means of a torsion spring 71 coiled around the shaft 72. The rotatable protecting cover 70 has a lock pin 73 provided on the inner side face thereof in the vicinity of the front edge of cover 70.

The pentagonal prism housing 62 has a lever 74 which is pivoted thereto by means of a pivot shaft 87 and which passes through a through hole 89 formed in the bottom of the recess 64 in the vicinity of the rear edge thereof. The lever 74 has at its projecting upper (outer) end a hook 74A which can be engaged by the lock pin 73 of the rotatable protecting cover 70. The lever 74 is continuously biased toward a locked position in which the hook 74A is engaged by the lock pin 73, by a torsion spring 75 which is coiled around the pivot shaft 87. The hook 74A has an inclined upper surface portion 77 which enables lever 74 to easily move to an unlocked position in which the lock pin 73 is disengaged from the hook 74A, when lever 74 is pressed by the lock pin 73. Namely, when the rotatable protecting cover 70 is brought into the closed position (first rotational position) against the torsion spring 71, the lock pin 73 comes into abutment with the hook 74A, so that lever 74 will tend to be pressed downwardly by the lock pin 73. In this moment, due to the inclination of the inclined upper surface portion 77, the lever easily rotates about the pivot shaft 87, so that the lock pin 73 can move under the hook 74A, while causing a slight angular displacement of the lever 74. After the lock pin 73 comes under the hook 74A, the lever 74 is automatically returned to its initial position (i.e., its locked position) by the spring force of the torsion spring 75, as shown in FIG. 11, so that the lock pin 73 is engaged by the hook 74A in order to lock the rotatable protecting cover 70 in the closed position.

On the rear side face of the pentagonal prism housing 62 is provied a release button (i.e., a push button) 76 which extends therethrough to project outwardly therefrom. The inner end of the release button 76 abuts against the lower end of the lever 74, as can be seen in FIG. 11, so that when the release button 76 is pressed inwardly, lever 74 will rotate about the pivot shaft 87, against the torsion spring 75 so as to disengage hook 74A from lock pin 73. As a result, the rotatable protecting cover 70 is automatically brought into the second rotational position, i.e., the open position by the spring force of the torsion spring 75.

An electrical switch 78 having a movable contact 79a and a stationary contact 79b is provided on the pentagonal prism housing 62 at the front portion of the recess 64. The electrical switch 78 is turned ON only when the movable contact 79a comes into contact with the stationary contact 79b. The movable contact 79a is pressed toward the stationary contact 79b by the front end of the rotatable protecting cover 70 when the cover 70 is brought into the open position, so that an electrical connection will be established between the two contacts 79a and 79b. Namely, the switch 78 is turned ON only when the rotatable protecting cover 70 is in the open position. The switch 78 is electrically connected, for example, to an electrical power circuit (battery circuit) 100 of the display portion including the liquid crystal panel 66 of the camera, so that the switch 78 can be used a a main switch for the battery circuit 100 of the display portion of the camera, resulting in decreased power consumption of the battery or batteries.

Although the liquid crystal panel is provided on the pentagonal prism housing of a single lens reflex camera in the illustrated embodiments, the present invention can be applied to a camera in which the liquid crystal panel is provided on another portion of the camera.

Figure 14:
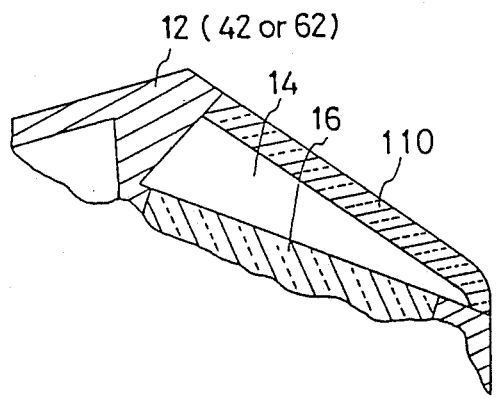
FIG. 14 is a partial longitudinal sectional view of an immovable transparent protecting cover according to another embodiment of the present invention.
Figure 15:
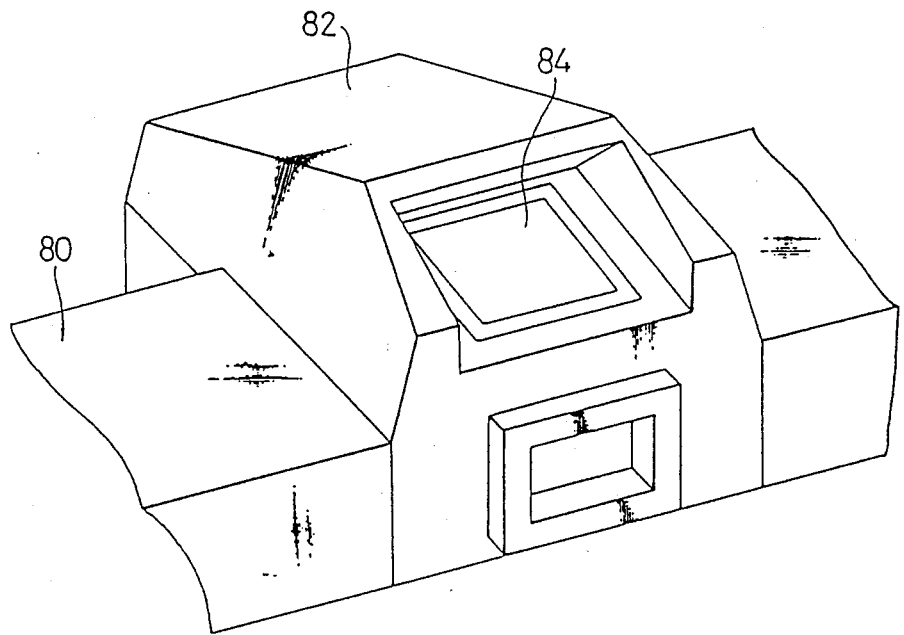
FIG. 15 is a perspective view of an upper portion of a known single lens reflex camera.

It is possible to provide an immovable protecting cover 110 which is partially or entirely transparent, so that the liquid crystal is visible without opening the protecting cover, as shown in FIG. 14. In FIG. 14, the transparent protecting cover 110 is integrally connected to the pentagonal prism housing 12 (42 or 62). It is unnecessary to provide an opening below the protecting cover in which an operator's finger can be inserted to slide or rotate the cover, as in the previous embodiments, since the protecting cover 110 is immovable.

It is also possible to provide a cap similar to the cap 32 (FIG. 6) which covers the finder eyepiece frame 11 on the rotatable protecting cover 50 or 70, similarly to the embodiment shown in FIG. 6.

In the illustrated embodiments, the liquid crystal panel can be replaced with, for example, an EL panel, or an LED panel or the like.

As can be understood from the foregoing, according to the present invention, the photographing data displaying portion provided on the camera body is protected by a protecting cover, so that no foreign matter can come into collision with the displaying portion.

I claim:
1. An apparatus for protecting a photographic data display portion of a camera body, said apparatus comprising a protective cover which includes means for attaching said protective cover to said camera body, said photographic data display portion comprising means for providing a visual display of photographic data to a user, said photographic data display portion being positioned in a recessed area of said camera body, said cover being positioned over said display portion and being slidably positioned within an upper portion of said recessed area, said protective cover further being attached to a removable finder eyepiece frame cap.

2. An apparatus according to claim 1, wherein said protective cover is movable between a closed position in which the display portion is closed by the protective cover and an open position in which the display portion is uncovered by the protective cover.

3. An apparatus according to claim 2, wherein said camera body comprises a pentagonal prism housing having a recess with a bottom, and wherein said photographic data display portion comprises a display provided in the bottom of the recess.

4. A protecting apparatus according to claim 1, wherein said protecting cover is at least partially transparent.

5. An apparatus according to claim 1, wherein said photographic data display portion comprises a liquid crystal display member.

6. An apparatus according to claim 1, wherein said photographic data display portion comprises a light emitting diode member.

7. An apparatus according to claim 1, wherein said cover is transparent.

8. An apparatus according to claim 1, wherein said protective cover is movably positioned over said display portion.

9. An apparatus according to claim 1, in combination with said camera body, wherein said camera body includes an opening along one surface of said camera body for permitting entry of the finger of a user in order to move said cover.

10. An apparatus according to claim 1, wherein said photographic data display portion comprises an electroluminescent display member.

11. An apparatus for protecting a photographic data disply portion of a camera body, said apparatus comprising a protective cover for protecting said photographic data display portion, said protective cover being movable between a closed position in which said photographic data display portion is closed by said protective cover and an open position in which said photographic data display portion is uncovered by said protective cover, said camera body comprising a housing with said photographic data display portion being positioned in said housing, said housing further including guide means in which said protective cover is slidably held, wherein said protective cover comprises lock means for locking the protective cover in said closed position.

12. An apparatus according to claim 11, wherein said guide means comprises a guide groove.

13. An apparatus according to claim 12, wherein said lock means comprises lock pins movably held in the protective cover and corresponding holes provided in the housing, said lock pins being engaged in the corresponding holes when the protective cover is in said closed position.

14. An apparatus for protecting a photographic data display portion of a camera body, said apparatus comprising a protective cover for protecting said photographic data display portion, said protective cover being movable between a closed position in which said photographic data display portion is closed by said protective cover and an open position in which said photographic data display portion is uncovered by said protective cover, said camera body comprising a housing with said photographic data display portion being positioned in said housing, said housing further including guide means in which said protective cover is slidably held, said camera body having a finder eyepiece frame, wherein said protective cover comprises a cap which covers the finder of the eye piece frame.

15. An apparatus according to claim 14, wherein said housing has a recess with a bottom, and said display portion being located along said bottom.

16. An apparatus for protecting a photographic data display portion of a camera body, said apparatus comprising a protective cover for protecting said photographic data display portion, said protective cover being movable between a closed position in which said photographic data display portion is closed by said protective cover and an open position in which said photographic data display portion is uncovered by said protective cover, said camera body comprising a housing with said photographic data display portion being positioned in said housing, said housing further including guide means in which said protective cover is slidably held, wherein said housing comprises a pentagonal prism housing.

* * * * *

UNITED STATES PATENT AND TRADEMARK OFFICE
CERTIFICATE OF CORRECTION

PATENT NO. : 4,903,062

DATED : February 20, 1990

INVENTOR(S) : T. KIRIGAYA

It is certified that error appears in the above-identified patent and that said Letters Patent is hereby corrected as shown below:

```
      In the Abstract, line 2, delete "in".
      In the Abstract, line 5, change "displaying" to ---
display---.
      Column 1, line 25, change "displaying" to ---display---.
      Column 2, line 12, change "embodiemnt" to ---embodiment---.
      Column 2, line 34, delete "the" before "recess".
      Column 2, line 54, change "groove" to ---grooves---.
      Column 3, line 38, delete "." after "48".
      Column 3, line 44, change "which" to ---with--- before
"stop".
      Column 3, line 46, change "extends" to ---extend---.
      Column 3, line 47, delete "the" before "rotatable".
      Column 3, line 53, change "projecting" to ---protecting---.
      Column 3, lines 53/54, change "semisphereical" to ---
semispherical---.
      Column 3, line 54, change "53" to ---53A--- before "of".
      Column 4, line 1, change "tsop" to ---stop---.
      Column 4, line 11, change "to" to ---,---.
      Column 4, line 18, delete "the" after "of".
      Column 4, line 31, change "wide" to ---side---.
      Column 4, line 55, change "66" to ---64--- after
"recess".
      Column 5, line 4, insert ---,--- after "position".
      Column 5, line 5, delete "the" before "hook".
      Column 5, line 7, change "The hook" to ---Hook---.
      Column 5, line 34, insert ---,--- after "75".
      Column 5, line 37, insert ---,--- before "by".
      Column 5, line 55, change "aa" to ---as a---.
```

UNITED STATES PATENT AND TRADEMARK OFFICE
CERTIFICATE OF CORRECTION

PATENT NO. : 4,903,062

DATED : February 20, 1990

INVENTOR(S) : T. KIRIGAYA

It is certified that error appears in the above-identified patent and that said Letters Patent is hereby corrected as shown below:

Column 6, lines 13/14, change "displaying" to ---display---.

Column 6, line 16, change "displaying" to ---display---.

Column 6, line 40 (claim 4, line 1), change "A protecting" to ---An---.

Column 6, line 41 (claim 4, line 2), change "protecting" to ---protective---.

Column 6, line 63 (claim 11, line 2), change "disply" to ---display---.

Signed and Sealed this

Twenty-seventh Day of October, 1992

*Attest:*

DOUGLAS B. COMER

*Attesting Officer*     Acting Commissioner of Patents and Trademarks